(12) United States Patent
Iida

(10) Patent No.: US 7,236,513 B2
(45) Date of Patent: Jun. 26, 2007

(54) TRANSMISSION METHOD AND TRANSMITTER

(75) Inventor: Sachio Iida, Chiba (JP)

(73) Assignee: Sony Corporation, Tokyo (JP)

( * ) Notice: Subject to any disclaimer, the term of this patent is extended or adjusted under 35 U.S.C. 154(b) by 702 days.

(21) Appl. No.: 10/763,173

(22) Filed: Jan. 26, 2004

(65) Prior Publication Data

US 2005/0169351 A1 Aug. 4, 2005

(30) Foreign Application Priority Data

Feb. 3, 2003 (JP) .............................. 2003-026460

(51) Int. Cl.
*H04L 17/02* (2006.01)
(52) U.S. Cl. ...................... 375/146; 375/261; 375/279; 375/295
(58) Field of Classification Search ................ 375/140, 375/141, 146, 260, 261, 279, 282, 269, 280, 375/295, 354, 356, 362; 370/320, 324, 342, 370/441, 479, 503, 536, 542, 544
See application file for complete search history.

(56) References Cited

U.S. PATENT DOCUMENTS 5,148,127 A 9/1992 Cheon
5,546,423 A * 8/1996 Sehier et al. ................ 375/141
6,603,818 B1 * 8/2003 Dress et al. ................. 375/295
2006/0078041 A1 * 4/2006 Uchiyama et al.

FOREIGN PATENT DOCUMENTS

JP 6-343086 12/1994

* cited by examiner

*Primary Examiner*—Dac V. Ha
(74) *Attorney, Agent, or Firm*—Oblon, Spivak, McClelland, Maier & Neustadt, P.C.

(57) ABSTRACT

An objective is to perform pulse modulation so as to allow for an effect of inter-symbol interference in the UWB communication. For this purpose, a reference clock signal is generated. Spread data is sequentially output at a specified timing synchronized with the reference clock. In this case, the spread data results from directly spreading transmission data with a spreading code. The spread data is distributed into two sequences of data at a specified timing synchronized with the reference clock. First and second pulse shaping signals are generated at a specified timing synchronized with the reference clock. A cosine carrier and a sine carrier are generated. One of the two sequences of data is multiplied by the first pulse shaping signal and the cosine carrier. The other of the two sequences of data is multiplied by the second pulse shaping signal and the sine carrier. Outputs from the multiplications are synthesized to acquire an output signal for transmission.

10 Claims, 16 Drawing Sheets

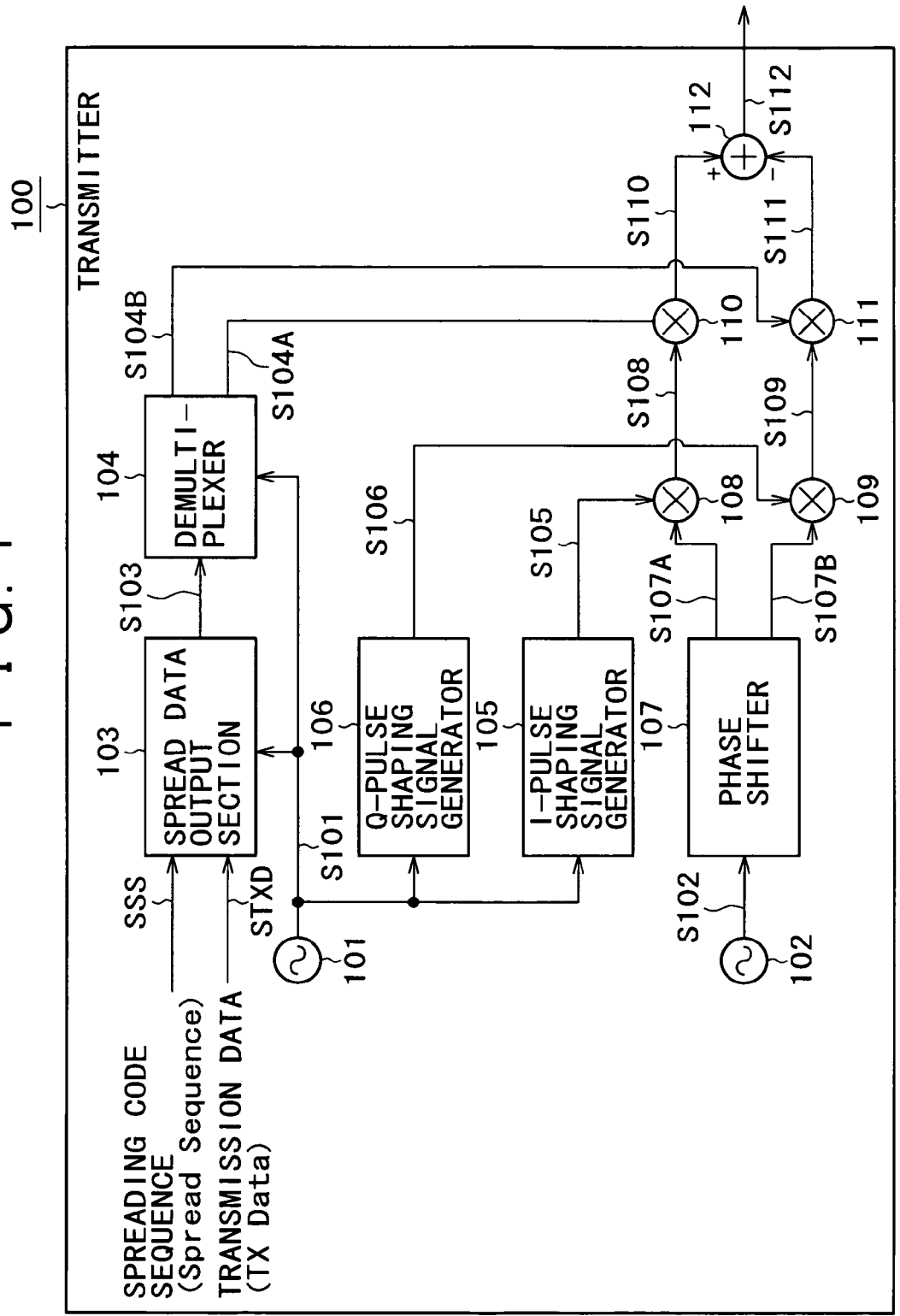

FIG. 2A  S101   
FIG. 2B  DATA CLK  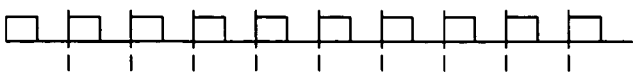
FIG. 2C  S103   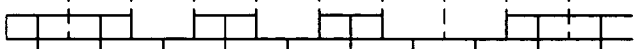
FIG. 2D  S104A  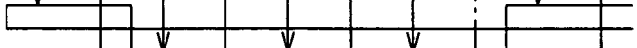
FIG. 2E  S104B  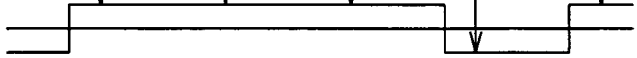
FIG. 2F  S105   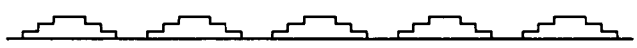
FIG. 2G  S106   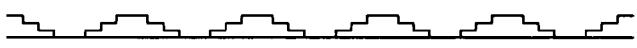
FIG. 2H  S107A  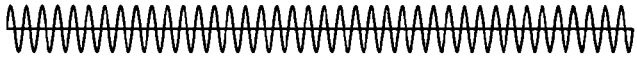
FIG. 2I  S107B  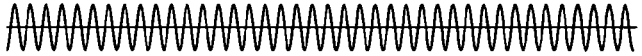
FIG. 2J  S108   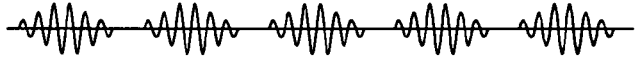
FIG. 2K  S109   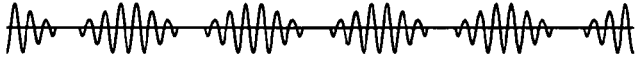
FIG. 2L  S110   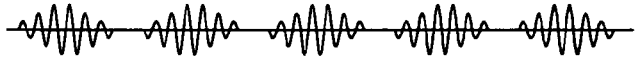
FIG. 2M  S111   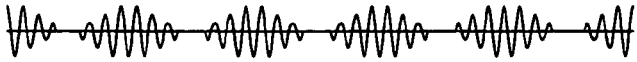
FIG. 2N  S112   

FIG. 4A  S101  
FIG. 4B  DATA CLK  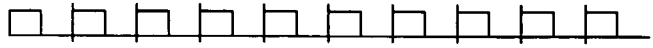
FIG. 4C  S103  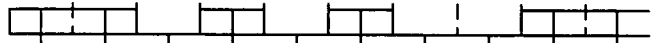
FIG. 4D  S104A  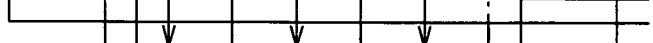
FIG. 4E  S104B  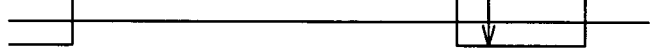
FIG. 4F  S105  
FIG. 4G  S106  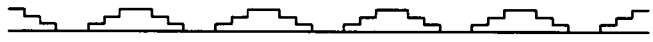
FIG. 4H  S121  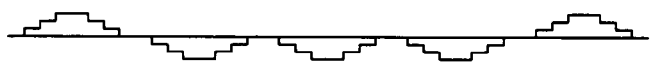
FIG. 4I  S122  
FIG. 4J  S107A  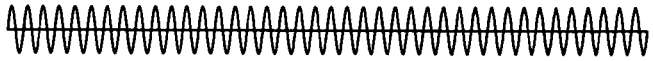
FIG. 4K  S107B  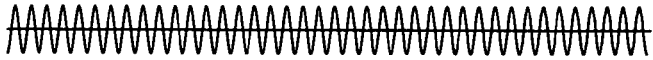
FIG. 4L  S110  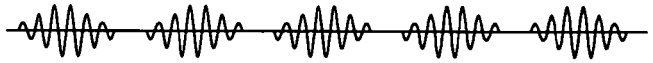
FIG. 4M  S111  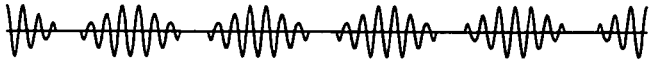
FIG. 4N  S112  

FIG. 7A  S101  
FIG. 7B  DATA CLK  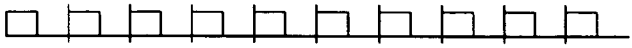
FIG. 7C  S103  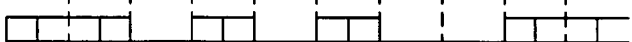
FIG. 7D  S104A  
FIG. 7E  S104B  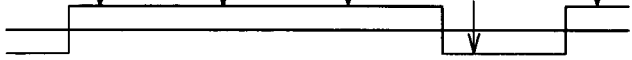
FIG. 7F  S105  
FIG. 7G  S106  
FIG. 7H  S107A  
FIG. 7I  S107B  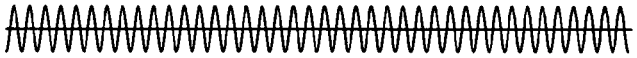
FIG. 7J  S131  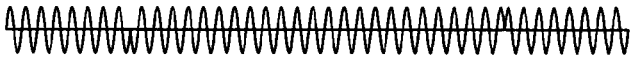
FIG. 7K  S132  
FIG. 7L  S110  
FIG. 7M  S111  
FIG. 7N  S112  

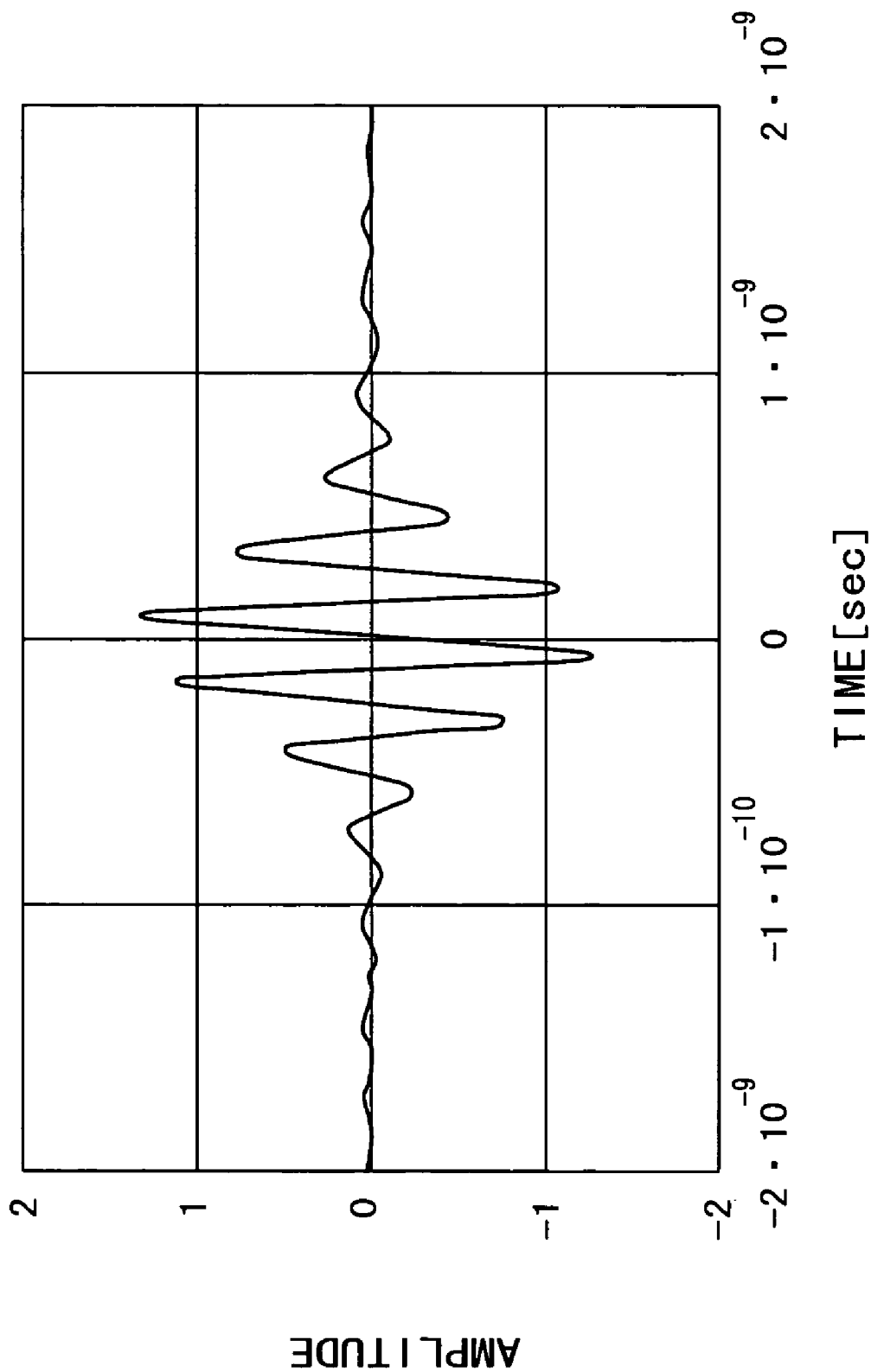

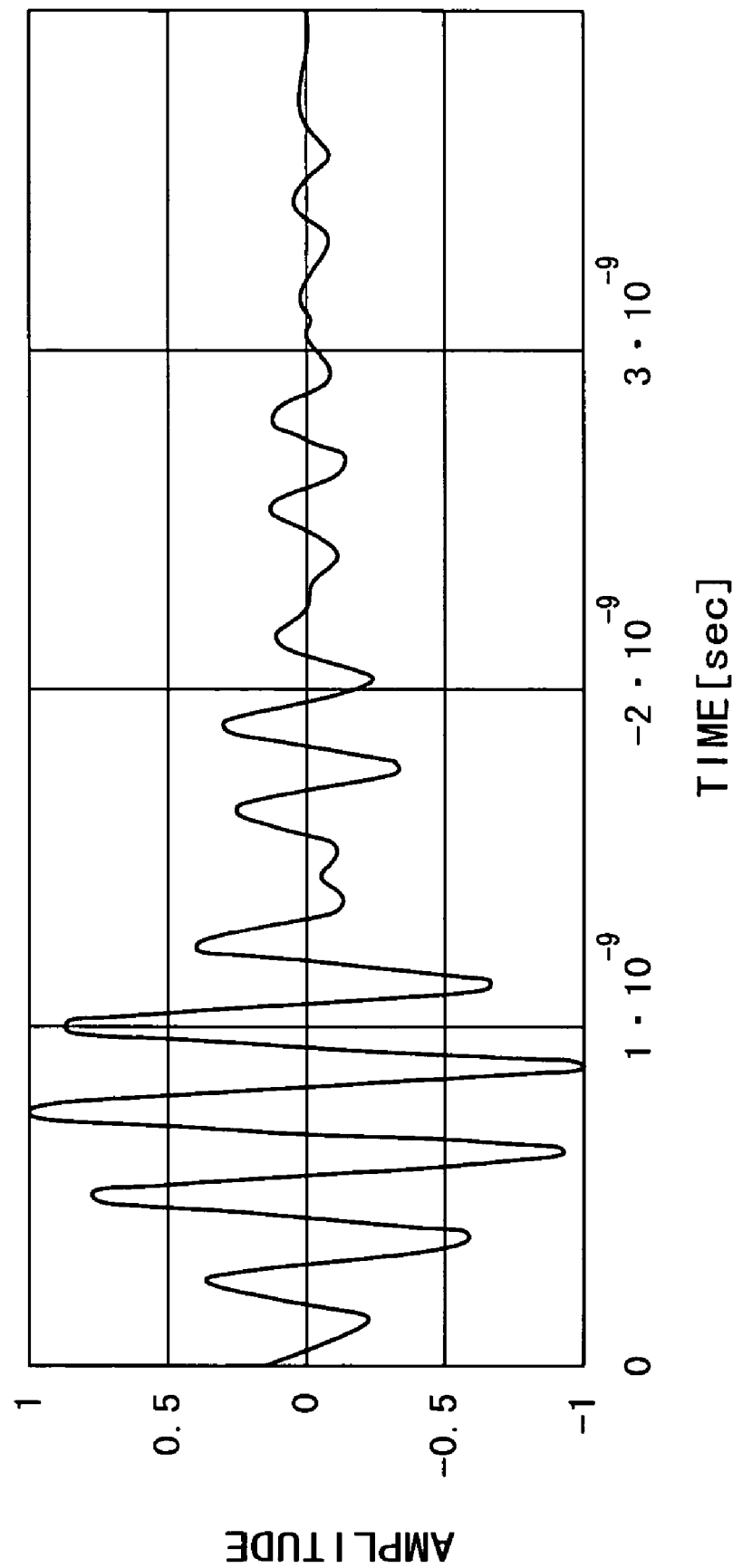

TRANSMISSION METHOD AND TRANSMITTER

BACKGROUND OF THE INVENTION

1. Field of the Invention

The present invention relates to a transmission method and a transmitter using the Ultra Wide-Band (UWB) system for transmission.

2. Description of Related Art

Particular attention has been paid to the UWB system as one of wireless transmission systems. The UWB system realizes transmission using a very wide transmission band of, for example, several gigahertzes and using very short pulses.

A recent trend is to put SS (Spread Spectrum) based wireless LAN (Local Area Network) systems to practical use. There are proposed SS based UWB transmission systems for PAN applications and the like.

The SS systems include the DS (Direct Spread) system. According to this system, the transmission side multiplies an information signal by a random code sequence called a PN (Pseudo Noise) code to spread a dedicated band for transmission. The reception side multiplies the received spread information signal by the PN code to reversely spread the information signal for reproduction.

The UWB transmission system includes two types: DS-UWB and impulse-UWB. The DS-UWB system maximizes spread code speeds of DS information signals. The impulse-UWB system configures an information signal using an impulse signal sequence having a very short cycle of approximately several hundred picoseconds to send and receive the signal sequence.

The DS-UWB can control spectra using PN code speeds, but needs to fast operate logic circuits in units of GHz. The power consumption increases dramatically. On the other hand, the impulse-UWB system can be configured in combination with a pulse generator and a low-speed logic circuit. There is an advantage of decreasing the current consumption. However, the pulse generator makes it difficult to control spectra.

Both systems implement high-speed data transmission by spreading signals to an ultra-high frequency band, e.g., between 3 and 10 GHz for transmission and reception. The dedicated bandwidth is expressed in units of GHz so that a value approximate to 1 results from division of the dedicated bandwidth by a center frequency (e.g., 1 to 10 GHz). The dedicated bandwidth is ultra wide compared to bandwidths normally used for wireless LANs based on the W-CDMA or cdma2000 system, and the SS (Spread Spectrum) or OFDM (Orthogonal Frequency Division Multiplexing) system.

Since the impulse-UWB system uses a very narrow pulse for the impulse signal, a very wide band is used in terms of the frequency spectrum. Consequently, an input information signal merely indicates a power smaller than the noise level in respective frequency domains. Available modulation systems include PPM (Pulse Position Modulation) to represent a code according to a position between pulses, Bi-phase Modulation to represent a code according to a pulse's phase change, and amplitude modulation.

FIG. 10 shows a configuration example of a conventional UWB transceiver. An antenna 11 is connected to an antenna changer 13 via a band-pass filter 12. The antenna changer 13 is connected to reception-related circuits and transmission-related circuits. The antenna changer 13 functions as a selection switch to operate in interlock with transmission and reception timings. The band-pass filter 12 passes signals of transmission bandwidths of several gigahertzes such as 4 to 9 GHz used for the system.

The reception-related circuits connected to the antenna changer 13 include a low noise amplifier 14, 2-system multipliers 15I and 15Q, low pass filters 16I and 16Q, and analog-digital converters 17I and 17Q. The low noise amplifier 14 amplifies an output from the antenna changer 13 for reception. The multipliers 15I and 15Q multiply an output from the low noise amplifier 14 by outputs from pulse generators 25I and 25Q. The low pass filters 16I and 16Q eliminate high frequency components from outputs from the multipliers 15I and 15Q. The analog-digital converters 17I and 17Q sample outputs from the low pass filters 16I and 16Q.

Output pulses from the pulse generator 25I and 25Q are phase-shifted from each other by the specified amount. The analog-digital converter 17I samples I-channel transmission data. The analog-digital converter 17Q samples Q-channel transmission data. Received data for each channel is supplied to the baseband circuit 30 for reception processing. In this example, received data for the I channel is used as is. Received data for the Q channel is used as an error signal.

As transmission-related circuits, the multiplier 26 is supplied with transmission data output from the baseband circuit 30. The transmission data is multiplied by an output from the pulse generator 25I. The transmission data output from the baseband circuit 30 is modulated, e.g., as an NRZ (Non Return to Zero) signal. The multiplier 26 multiplies the transmission data by an output from the pulse generator 25I to generate a bi-phase modulated pulse. This becomes a signal modulated by the so-called BPSK (Binary Phase Shift Keying) system. In order to allow the pulse generator 25I to generate pulses, there is provided a Voltage Controlled Temperature Compensated Crystal Oscillator (VCTCXO, hereafter simply referred to as an oscillator) 21 to control oscillation frequencies of the oscillator 21 based on an error signal acquired from received data for the Q channel, for example.

An oscillation signal from the oscillator 21 is supplied to a PLL (phase locked loop) circuit 22. A voltage control oscillator 23 constitutes a loop for the PLL circuit 22. An oscillated output from the voltage control oscillator 23 is supplied to the pulse generator 25I to generate a pulse synchronized to the oscillated output from the oscillator 23. A phase shifter 24 supplies a pulse generator 25Q with an output from the oscillator 23 by delaying a specified cyclic phase. This makes it possible to generate a short wavelength pulse synchronized with the oscillated output from the oscillator 23 at a timing delayed from an output pulse of the pulse generator 25I.

A multiplier 26 multiplies an output pulse from the pulse generator 25Q by the transmission data to use the multiplication output as a transmission signal. The transmission signal output from the multiplier 26 is supplied to a power amplifier 27 and is amplified there for transmission. The amplified output is supplied to the band-pass filter 12 via the antenna changer 13. The band-pass filter 12 limits the band to pass only signals for the transmission band. The transmission signal is then transmitted from the antenna 11.

Non-patent document 1 outlines the UWB system.

[Non-patent document 1]

Nikkei Electronics, 11 Mar. 2002, pp. 55–66.

A pulse used for the impulse-UWB system is a signal having the wideband frequency spectrum. The time domain is equivalent to a monocycle waveform expressed by equation 1, for example.

$$V(t) = \frac{\sqrt{e}}{t_P} \cdot t \cdot \exp\left[-\frac{1}{2} \cdot \left(\frac{t}{t_P}\right)^2\right]$$ [Equation 1]

In equation 1, tP represents the time from the monocycle waveform center to a peak value. In the case of tP=200 [psec], for example, the time waveform becomes a monocycle waveform generated at its maximum value of ±200 [psec] as shown in FIG. 11. We can confirm that the monocycle waveform's spectrum has the maximum value of approximately 1 [GHz] and the −3 dB bandwidth of approximately 1 [GHz].

We examine generating a single sideband of the monocycle waveform for frequency conversion. The reason is that the UWB system specifies the following two spectrum requirements for transmission pulses.

(1) The US FCC spectrum mask specification, one of UWB specifications, requires that radiation levels be decreased in the bands except 3.1 through 10.6 [GHz].

(2) The band of 4.9 through 5.8 [GHz] contains 5 GHz wireless LANs that should be avoided.

In consideration for these requirements, we can assume to be able to solve the above-mentioned problems of the spectrum in the UWB communication system as follows. That is to say, the spectrum in FIG. 12 is converted into the frequency range, e.g., between 3.1 and 4.9 [GHz] to generate an upper side band spectrum as shown in FIG. 13. There is provided a method of frequency converting the monocycle waveform in the upper side band. The method subtracts a signal obtained as a product of multiplying a Hilbert transformed monocycle waveform in FIG. 14 by a 3.1 [GHz] sine carrier from a signal obtained as a product of multiplying the monocycle waveform by a 3.1 [GHz] cosine carrier.

A pulse waveform in FIG. 15 represents the time waveform resulting from the spectrum in FIG. 12. The envelope's amplitude gradually increases, peaks at the origin, and gradually decreases. Accordingly, it can be understood that the envelope approximates to a triangle. Further, it can be understood that a 6-cycle pulse waveform constitutes major amplitude components.

To solve the above-mentioned problems of the spectrum in the UWB communication system, we can come to a solution generate an N-cycle pulse whose envelope is amplified and is formed as a triangle. For example, the waveform in FIG. 15 has the duration of approximately 2 [nsec]. Arranging this pulse waveform in a series enables the BPSK communication at 500 [Mb/s] by preventing a series of pulse waveforms from overlapping with each other.

To achieve a higher communication rate such as 1 [Gb/s], however, the waveform in FIG. 15 needs to be arranged at a 1 [nsec] interval. Consequently, some waveforms may overlap with each other. When the receiver uses a band-pass filter, it is known that an impulse response of the band-pass filter causes a previous pulse's amplitude to affect the subsequent pulses. This problem is called an inter-symbol interference and should be considered when narrowing the band for improving the frequency utilization.

According to the Nyquist's theorem, a baseband bandwidth of ½T [Hz] is required to transmit pulses at a T [sec] interval without distortion, where 1/T [Hz] is the Nyquist bandwidth. Since the frequency under discussion ranges from 3.1 to 4.9 [GHz], the bandwidth is 1.8 [GHz] and the baseband bandwidth is its half, i.e., 900 [MHz]. It fully ensures the minimum baseband bandwidth of 500 [MHz] to transmit pulses at a T [sec] interval but is 10[%] fall short of the 1 [GHz] Nyquist bandwidth.

Nyquist showed that the Nyquist filter should be used to satisfy the condition of no distortion below the Nyquist bandwidth. However, it is difficult to create a 1 [GHz] baseband digital filter. The reason is that creating the intended digital filter requires, e.g., an 8-bit D/A converter operating at least at a sampling frequency of approximately 4 [GHz]. Presently, there is a marketed example as a standalone unit that uses four D/A converters at 1.25 [Gsamples/sec] to acquire 5 [Gsamples/sec] Though such product is available on the current technological level, the design is unfavorable from the viewpoint of the cost effectiveness between the power consumption and installation costs when the UWB communication is applied to the consumer equipment.

An alternative to the baseband digital filter may be a band-pass filter (BPF) for high frequency bands. FIG. 16 shows an impulse response when a 5-polar Butterworth filter is used for the BPF having the 4 [GHz] center frequency and the 1.8 [GHz]band. As seen from the impulse response in FIG. 16, its main wave in the vicinity of 0.8 [nsec] indicates that the BPF is subject to a delay time of 0.8 [nsec]. However, there is also generated a swell as large as one third of the main wave in the vicinity of 1.8 [nsec]. In this manner, an inter-symbol interference occurs due to the impulse response when a non-Nyquist filter is used.

SUMMARY OF THE INVENTION

The present invention has been made in consideration of the foregoing. It is therefore an object of the present invention to provide a high communication speed by performing pulse modulation and generating transmission signals so as to allow for an effect of the inter-symbol interference resulting from the use of non-Nyquist filters in the UWB communication.

The present invention generates a reference clock signal; sequentially outputs spread data at a specified timing synchronized with the reference clock, wherein the spread data results from directly spreading transmission data with a spreading code; distributes the spread data into two sequences of data at a specified timing synchronized with the reference clock; generates first and second pulse shaping signals at a specified timing synchronized with the reference clock; generates a cosine carrier and a sine carrier; multiplies one of the two sequences of data, the first pulse shaping signal, and the cosine carrier together; multiplies the other of the two sequences of data, the second pulse shaping signal, and the sine carrier together; and synthesizes outputs from the multiplications to acquire an output signal for transmission.

The present invention distributes spread data directly distributed by a spreading code sequence into two sequences of transmission data in synchronization with the reference clock signal. When the two sequences of transmission data are assumed to be I and Q data maintaining the time relationship so that their transition timings shift by a half cycle, this signal becomes an NRZ signal having a signal rate that is half the spread data. The cosine carrier and the sine carrier are orthogonally phase-shifted by 90 degrees.

One of two sequences of transmission data is multiplied by the first pulse shaping signal and the cosine carrier to generate a BPSK modulated I pulse. The other of two sequences of transmission data is multiplied by the second pulse shaping signal and the sine carrier to generate a BPSK modulated Q pulse. The BPSK modulated I and Q pulses are synthesized to be an output signal.

BRIEF DESCRIPTION OF THE DRAWINGS

FIG. 1 is a configuration diagram showing the pulse phase modulation configuration of a transmitter according to a first embodiment of the present invention;

FIG. 2 is a waveform chart exemplifying signal waveforms according to the configuration in FIG. 1;

FIG. 4 is a waveform chart exemplifying signal waveforms according to the configuration in FIG. 3;

FIG. 7 is a waveform chart exemplifying signal waveforms according to the configuration in FIG. 6;

FIG. 15 is a waveform chart showing a time waveform for the upper side band of the mono-cycle pulse in FIG. 13; and FIG. 16 is a characteristics diagram showing an impulse response of the band-pass filter.

DETAILED DESCRIPTION OF THE PREFERRED EMBODIMENTS

Figure 3:
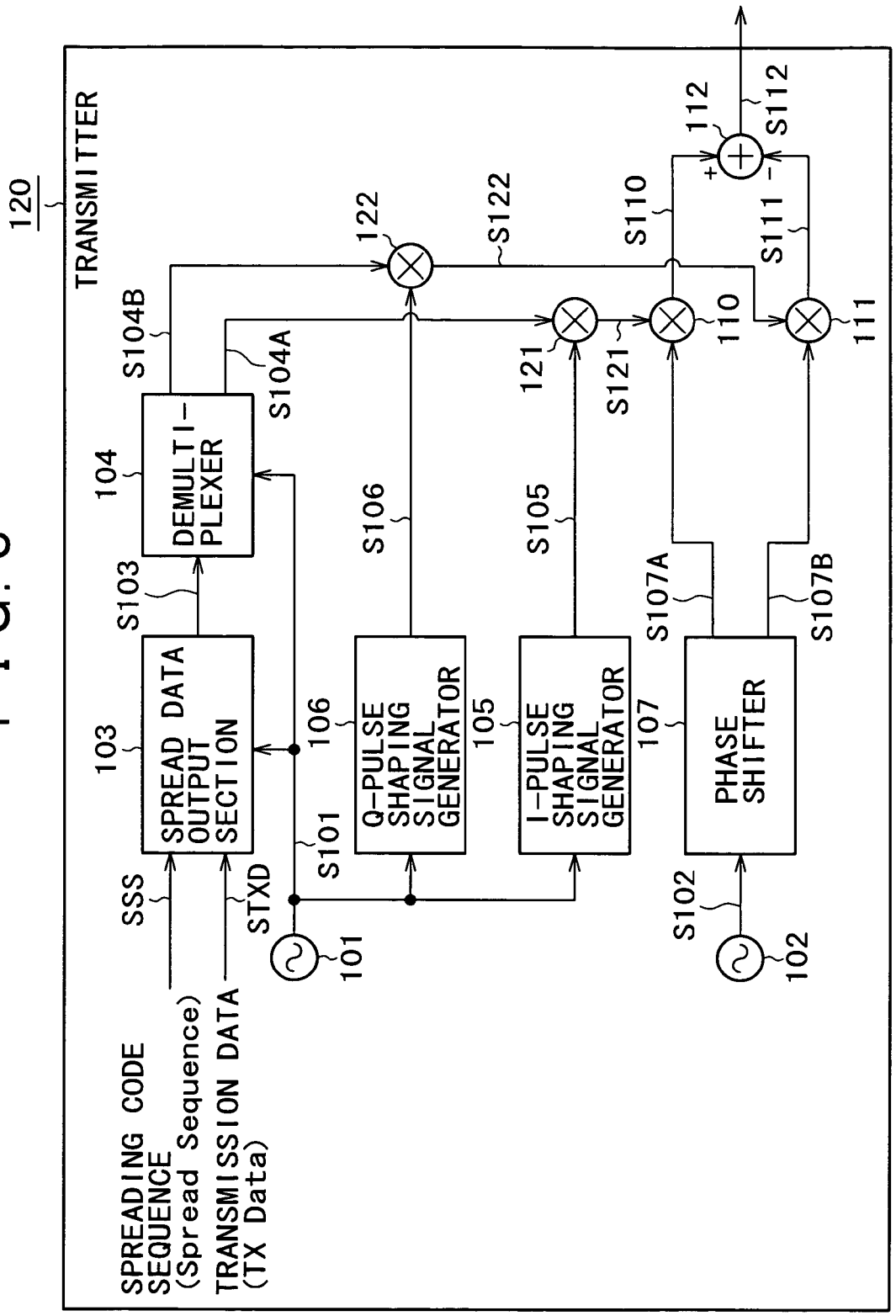
FIG. 3 is a configuration diagram showing the pulse phase modulation configuration of a transmitter according to a second embodiment of the present invention.

The first embodiment of the present invention will be described in further detail with reference to FIGS. 1 and 2.

The embodiment provides the configuration for processing transmission signals of a transmitter or a transceiver applied to the UWB system for wireless transmission. FIG. 1 shows the pulse phase modulation configuration of a transmitter 100 according to the embodiment. The transmitter 100 is provided with a first oscillator 101 that outputs a reference clock S101.

Further, there are provided a spread data output section 103 and a demultiplexer 104. The spread data output section 103 directly spreads transmission data STXD using a specified spreading code SSS. The demultiplexer 104 distributes spread data S103 generated by the direct spreading into I data S104A and Q data S104B. Moreover, there are provided an I-pulse shaping signal generator 105 and a Q-pulse shaping signal generator 106. The I-pulse shaping signal generator 105 generates an I-pulse shaping signal S105 based on the reference clock S101 from the first oscillator 101. The Q-pulse shaping signal generator 106 generates a Q-pulse shaping signal S106. Specific configuration examples of the I-pulse shaping signal generator 105 and the Q-pulse shaping signal generator 106 will be described with reference to FIGS. 8 and 9.

Furthermore, there are provided an oscillator 102 and a phase shifter 107. The oscillator 102 generates a carrier signal S102. The phase shifter 107 shifts a phase of the carrier signal S102 and outputs a cosine carrier S107A and a sine carrier S107B.

The first multiplier 108 multiplies the cosine carrier S107A output from the phase shifter 107 by the I-pulse shaping signal S105 output from the I-pulse shaping signal generator 105 to generate an I pulse S108.

The second multiplier 109 multiplies the sine carrier S107B output from the phase shifter 107 by the Q-pulse shaping signal S106 output from the Q-pulse shaping signal generator 106 to generate an Q pulse S109.

An I pulse S108 output from the first multiplier 108 is supplied to a third multiplier 110. The multiplier 110 multiplies the I pulse S108 by I data S104A output from the demultiplexer 104 to BPSK modulate the I pulse S108 and generates an I pulse S110.

Likewise, a Q pulse S109 output from the second multiplier 109 is supplied to a fourth multiplier 111. The multiplier 111 multiplies the Q pulse S109 by Q data S104B output from the demultiplexer 104 to BPSK modulate the Q pulse S109 and generates a Q pulse S111.

There is provided an adder 112 that synthesizes the BPSK modulated I pulse S110 with the BPSK modulated Q pulse S111 to generate an output signal S112. To synthesize the pulses and generate the output signal S112, the adder 112 uses polarities for subtracting the BPSK modulated Q pulse S111 from the BPSK modulated I pulse S110. For example, the output signal S112 can be amplified for transmission and wirelessly transmitted as a UWB signal from an antenna.

FIG. 2 exemplifies signal waveforms that are processed by the components of the configuration in FIG. 1. The following describes the waveforms in FIG. 2.

The reference clock S101 of FIG. 2(a) is a 4 [GHz] clock.

Data CLK of FIG. 2(b) is a 1 [GHz] clock signal. A configuration to supply the data clock is omitted from FIG. 1.

The spread data S103 of FIG. 2(c) is a 1 [Gbps] digital signal generated by directly spreading the transmission data STXD with the spreading code SSS.

The I data S104A of FIG. 2(d) is a 500 [Mbps] NRZ signal generated by distributing the spread data S103 in the demultiplexer 104 in the order indicated by broken lines.

The Q data S104B of FIG. 2(e) is a 500 [Mbps] NRZ signal generated by distributing the spread data S103 in the demultiplexer 104 in the order indicated by dot-dash lines.

The I-pulse shaping signal S105 of FIG. 2(f) is a stepped triangle-wave analog signal generated in the I-pulse shaping signal generator 105 and synchronizes with the I data S104A.

The Q-pulse shaping signal S106 of FIG. 2(g) is a stepped triangle-wave analog signal generated in the Q-pulse shaping signal generator 106 and synchronizes with the Q data S104B.

The cosine carrier S107A of FIG. 2(h) is a 4 [GHz] NRZ signal.

The sine carrier S107B of FIG. 2(i) is a 4 [GHz] NRZ signal and is phase-shifted from the cosine carrier S107A by 90 degrees.

The I pulse S108 of FIG. 2(j) results from multiplying the I-pulse shaping signal S105 and the cosine carrier S107A together.

The Q pulse S109 of FIG. 2(k) results from multiplying the Q-pulse shaping signal S106 and the cosine carrier S107B together.

The BPSK modulated I pulse S110 of FIG. 2(l) results from multiplying the I data S104A and the I pulse S108 together.

The BPSK modulated Q pulse S111 of FIG. 2(m) results from multiplying the Q data S104B and the Q pulse S109 together.

The output signal S112 of FIG. 2(n) is generated by subtracting the BPSK modulated Q pulse S111 from the BPSK modulated I pulse S110.

The spread data output section 103 sequentially outputs the spread data S103 in the pulse phase conversion configuration of the transmitter 100 according to the embodiment. The spread data S103 synchronizes with the reference clock signal S101 and is generated by directly spreading the transmission data STXD with the spreading code sequence SSS. The demultiplexer 104 divides the spread data S103 into the I data S104A and the Q data S104B.

In this example, as seen from FIGS. 2(d) and 2(e), the I data S104A and the Q data S104B maintain the time relationship so that their transition timings shift by a half cycle. Both data are NRZ signals having a signal rate that is half the spread data S103. The I-pulse shaping signal generator 105 and the Q-pulse shaping signal generator 106 generate the I-pulse shaping signal S105 (FIG. 2(f)) and the Q-pulse shaping signal S106 (FIG. 2(g)) as stepped triangle waves. The I-pulse shaping signal S105 and the Q-pulse shaping signal S106 are generated at the timings so that each peak value of the waveforms corresponds to the center of the I data S104A and the Q data S104B, respectively. The configuration to generate a stepped triangle wave will be described later.

The first multiplier 108 multiplies cosine carrier S107A (FIG. 2(h)) by the I-pulse shaping signal S105 (FIG. 2(f)) to generate the 6-cycle I pulse S108 (FIG. 2(j)). The second multiplier 109 multiplies the sine carrier S107B (FIG. 2(i)) by the Q-pulse shaping signal S106 (FIG. 2(g)) to generate the 6-cycle Q pulse S109 (FIG. 2(k)). The cosine carrier S107A and the sine carrier S107B are orthogonal to each other with a phase difference of 90 degrees. Further, the third multiplier 110 BPSK modulates the I pulse S108 (FIG. 2(j)) with the I data S104A (FIG. 2(d)). The fourth multiplier 111 BPSK modulates the Q pulse S109 (FIG. 2(k)) with the Q data S104B (FIG. 2(e)). The adder 112 uses polarities for subtracting the BPSK modulated Q pulse S111 (FIG. 2(m)) from the BPSK modulated I pulse S110 (FIG. 2(l)) to synthesize both pulses and generates the output signal S112 (FIG. 2(n)).

The output signal processed as mentioned above shows a constant envelope because the BPSK modulated I and Q pulses generate the timings whose time relationship is characterized by a half-cycle shift. Each of the I and Q pulses is an N-cycle pulse in itself. Accordingly, these pulses are considered to mediate between the DS-UWB system and the impulse-UWB system in terms of the UWB transmission systems. The constant envelope in the output signal makes it possible to use nonlinear amplifiers such as C-class amplifiers, realizing a transmitter with high power efficiency.

As mentioned above, the N-cycle pulse has the narrow-band frequency spectrum. Therefore, the following advantages are provided. No band-pass filters are needed for transmission. The transmission side is free from an inter-symbol interference. The I and Q pules are subject to little, if any, interference therebetween due to a career's orthogonal phase error. The reason is that both pulses maintain the time relationship with their timings shifted by a half cycle. No signal occurs at the timings. The signal rate of the I and Q pulses each is half the spread data. This doubles an interval of the I and Q pulses in themselves. The pulses are subject to little inter-symbol interference occurring in the band-pass filter at the reception side.

Consequently, the transmitter configuration according to the embodiment can decrease effects of inter-symbol interference due to the use of non-Nyquist filters and increase the UWB communication speed.

Figure 5:
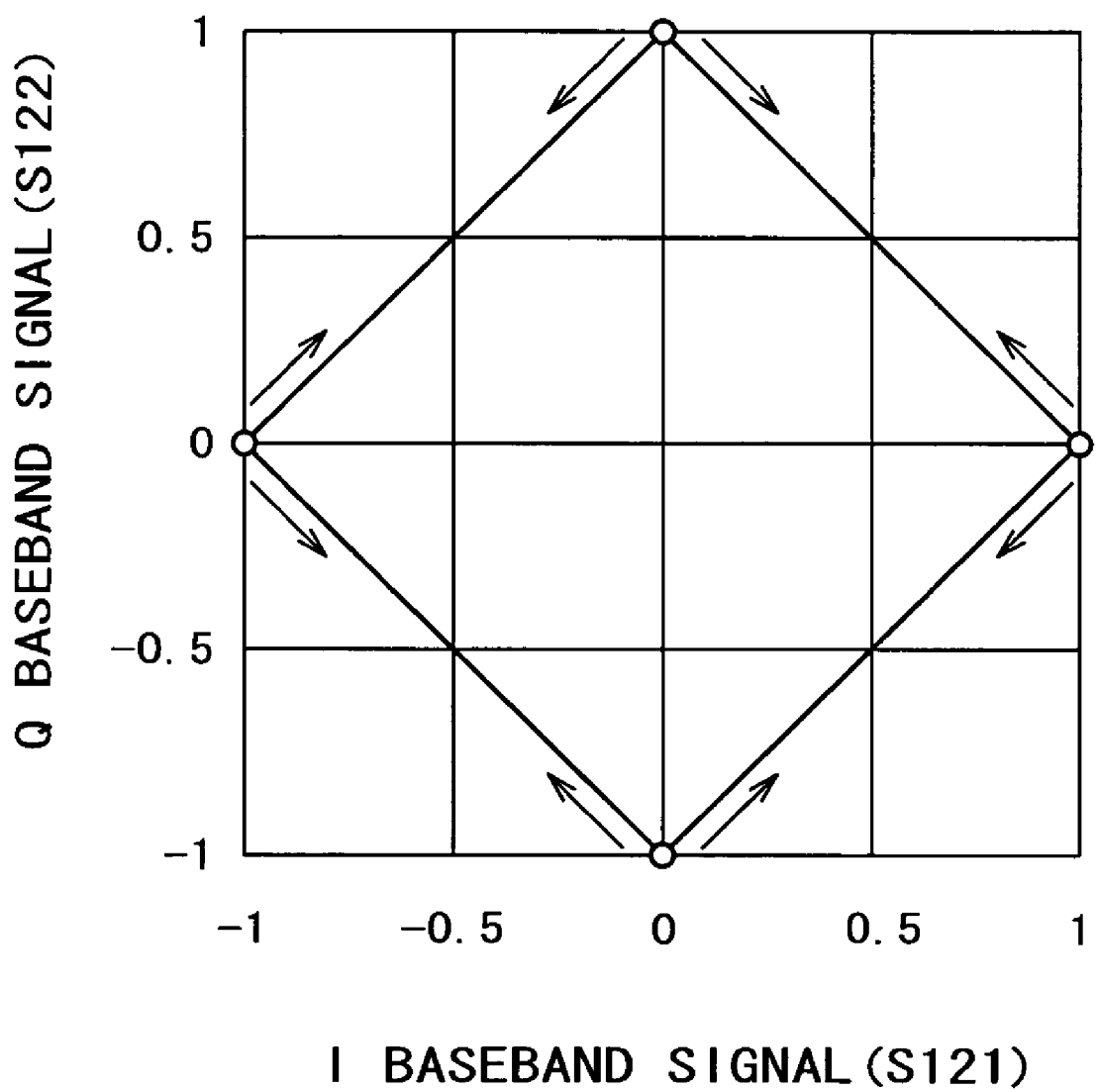
FIG. 5 is an explanatory diagram showing the constellation of baseband signals according to the configuration in FIG. 3.

Referring now to FIGS. 3 through 5, the second embodiment of the present invention will be described. The same parts or components are depicted by the same reference numerals with reference to FIGS. 3 through 5 for the second embodiment and FIGS. 1 and 2 for the above-mentioned first embodiment.

Like the first embodiment, the second embodiment provides the configuration for processing transmission signals of a transmitter or a transceiver applied to the UWB system for wireless transmission. FIG. 3 shows the pulse phase modulation configuration of a transmitter 120 according to the embodiment. The transmitter 120 comprises the first oscillator 101, the oscillator 102, the spread data output section 103, the demultiplexer 104, the I-pulse shaping signal generator 105, the Q-pulse shaping signal generator 106, and the phase shifter 107. The fist oscillator 101 outputs the reference clock S101. The oscillator 102 generates the carrier signal S102. The spread data output section 103 directly spreads transmission data STXD using a specified spreading code SSS. The demultiplexer 104 distributes the spread data S103 generated by the direct spreading into the I data S104A and the Q data S104B. The I-pulse shaping signal generator 105 generates the I-pulse shaping signal S105. The Q-pulse shaping signal generator 106 generates the Q-pulse shaping signal S106. The phase shifter 107 shifts a phase of the carrier signal S102 and outputs the cosine carrier S107A and the sine carrier S107B. The configurations of these processing means are the same as those described in the first embodiment with reference to FIG. 1. Specific configuration examples of the I-pulse shaping signal generator 105 and the Q-pulse shaping signal generator 106 will be described later.

In this example, there is provided a fifth multiplier 121. It multiplies the I data S104A output from the demultiplexer 104 by the I-pulse shaping signal S105 output from the I-pulse shaping signal generator 105. The multiplier 121 outputs a baseband signal S121. There is also provided a sixth multiplier 122. It multiplies the Q data S104B output from the demultiplexer 104 by the Q-pulse shaping signal S106 output from the shaping signal generator 106. The multiplier 122 output s baseband signal S122.

Further, there are provided a third multiplier 110, a fourth multiplier 111, and the adder 112. The third multiplier 110 multiplies an I baseband signal S121 by the cosine carrier S107A to output the BPSK modulated I pulse S110. The fourth multiplier 111 multiplies a Q baseband signal S122 by the sine carrier S107B to output the BPSK modulated Q pulse S111. The adder 112 synthesizes the BPSK modulated I pulse S110 with the BPSK modulated Q pulse S111 to generate the output signal S112. To synthesize the pulses and generate the output signal S112, the adder 112 uses polarities for subtracting the BPSK modulated Q pulse S111 from the BPSK modulated I pulse S110.

FIG. 4 exemplifies signal waveforms that are processed by the components of the configuration in FIG. 3. The following describes the waveforms in FIG. 4.

The reference clock S101 of FIG. 4(a) is a 4 [GHz]clock.

Data CLK of FIG. 4(b) is a 1 [GHz] clock signal. A configuration to supply the data clock is omitted from FIG. 3.

The spread data S103 of FIG. 4(c) is a 1 [Gbps] digital signal generated in the spread data output section 103 by directly spreading the transmission data STXD with the spreading code SSS.

The I data S104A of FIG. 4(d) is a 500 [Mbps] NRZ signal generated by distributing the spread data S103 in the demultiplexer 104 in the order indicated by broken lines.

The Q data S104B of FIG. 4(e) is a 500 [Mbps] NRZ signal generated by distributing the spread data S103 in the demultiplexer 104 in the order indicated by dot-dash lines.

The I-pulse shaping signal S105 of FIG. 4(f) is a stepped triangle-wave analog signal generated in the I-pulse shaping signal generator 105 and synchronizes with the I data S104A.

The Q-pulse shaping signal S106 of FIG. 4(g) is a stepped triangle-wave analog signal generated in the Q-pulse shaping signal generator 106 and synchronizes with the Q data S104B.

The I baseband signal S121 of FIG. 4(h) results from multiplying the I data S104A by the I-pulse shaping signal S105.

The Q baseband signal S122 of FIG. 4(i) results from multiplying the Q data S104B by the Q-pulse shaping signal S106.

The cosine carrier S107A of FIG. 4(j) is a 4 [GHz] NRZ signal.

The sine carrier S107B of FIG. 4(k) is a 4 [GHz] NRZ signal and is phase-shifted from the cosine carrier S107A by 90 degrees.

The BPSK modulated I pulse S110 of FIG. 4(l) results from multiplying the I baseband signal S121 and the cosine carrier S107A together.

The BPSK modulated I pulse S110 of FIG. 4(m) results from multiplying the Q baseband signal S122 and the sine carrier S107B together.

The output signal S112 of FIG. 4(n) is generated by subtracting the BPSK modulated Q pulse S111 from the BPSK modulated I pulse S110 and becomes the same as that in the first embodiment.

The spread data output section 103 sequentially outputs the spread data S103 in the transmitter 120 according to the second embodiment. The spread data S103 synchronizes with the reference clock signal S101 and is generated by directly spreading the transmission data STXD with the spreading code sequence SSS. The demultiplexer 104 divides the spread data S103 into the I data S104A and the Q data S104B. Here, the I data S104A and the Q data S104B maintain the time relationship so that their transition timings shift by a half cycle. Both data are NRZ signals having a signal rate that is half the spread data S103.

The I-pulse shaping signal generator 105 and the Q-pulse shaping signal generator 106 generate the I-pulse shaping signal S105 and the Q-pulse shaping signal S106 as stepped triangle waves. The I-pulse shaping signal S105 and the Q-pulse shaping signal S106 are generated at the timings so that each peak value of the waveforms corresponds to the center of the I data S104A and the Q data S104B, respectively. The fifth multiplier 121 multiplies the I data S104A and the I-pulse shaping signal S105 together to generate the I baseband signal S121. The sixth multiplier 122 multiplies the Q data S104B and the Q-pulse shaping signal S106 together to generate the Q baseband signal S122.

The third multiplier 110 multiplies the cosine carrier S107A and the I baseband signal S121 together to output the BPSK modulated I pulse S110. The fourth multiplier 111 multiplies the sine carrier S107B and the Q baseband signal S122 together to output the BPSK modulated Q pulse S111. The adder 112 uses polarities for subtracting the BPSK modulated Q pulse S111 from the BPSK modulated I pulse S110 to synthesize both pulses and generates the output signal S112.

The output signal S112 generated in this manner is essentially the same as that described in the first embodiment. That is to say, the output signal shows a constant envelope and can realize a transmitter with high power efficiency. No band-pass filters are needed for transmission. The transmission side is free from an inter-symbol interference. The signal rate of the I and Q pulses each is half the spread data. This doubles an interval of the I and Q pulses in themselves. The pulses are subject to little inter-symbol interference occurring in the band-pass filter at the reception side.

FIG. 5 shows a constellation display of the I baseband signal S121 and the Q baseband signal S122. As can be seen from FIG. 5, the constellation follows the state transition indicated by arrows between four symbol points on the I and Q axes. Since the state transition rotates 90 degrees at each symbol point, the modulation can be categorized as the π/2-shift BPSK (Binary Phase Shift Keying).

Figure 6:
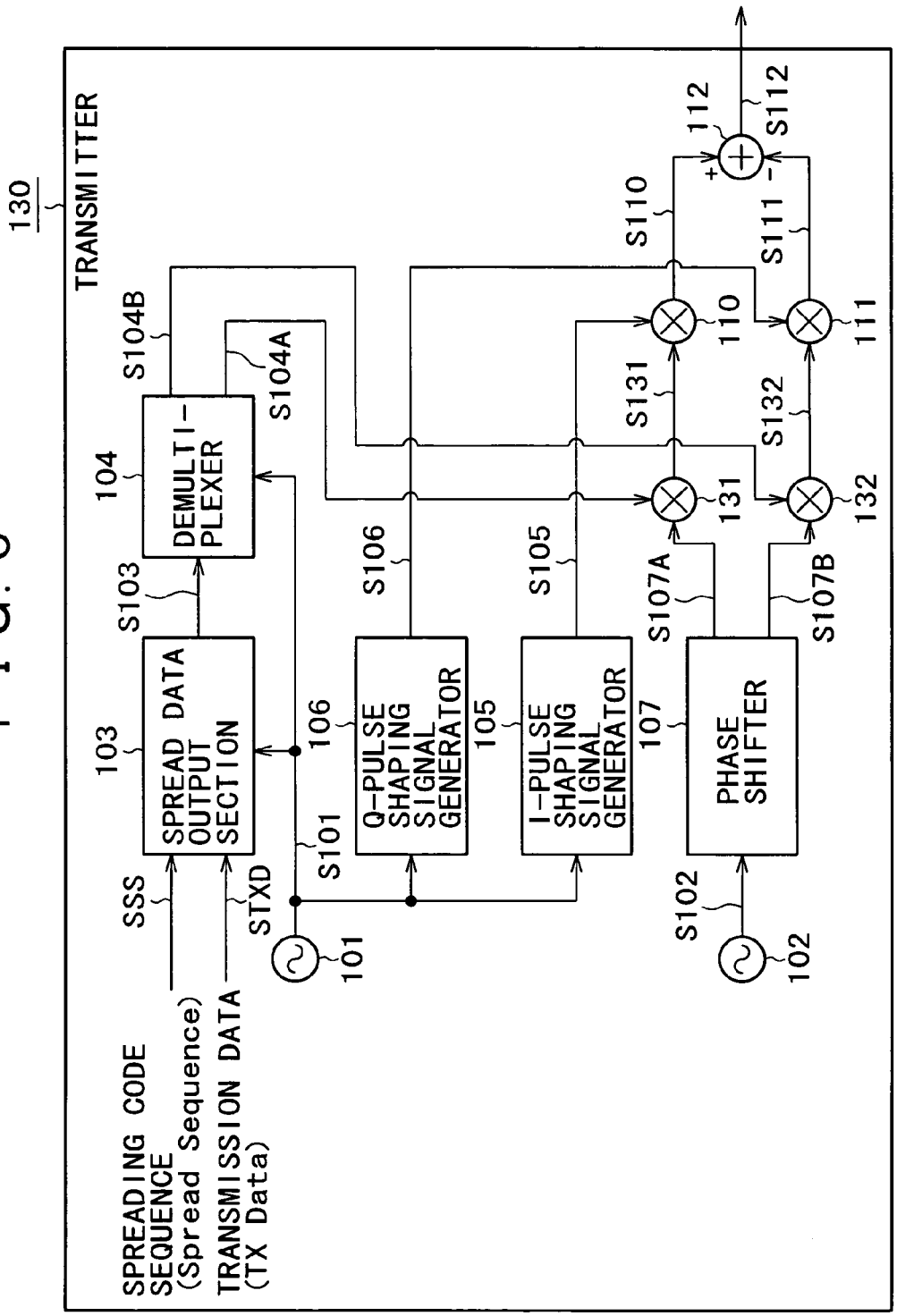
FIG. 6 is a configuration diagram showing the pulse phase modulation configuration of a transmitter according to a third embodiment of the present invention.

Referring now to FIGS. 6 and 7, the third embodiment of the present invention will be described. The same parts or components are depicted by the same reference numerals with reference to FIGS. 6 and 7 for the third embodiment and FIGS. 1 through 5 for the above-mentioned first and second embodiments.

FIG. 6 shows the pulse phase modulation configuration of a transmitter 130 according to the third embodiment of the present invention. The transmitter 130 comprises the first oscillator 101, the oscillator 102, the spread data output section 103, the demultiplexer 104, the I-pulse shaping signal generator 105, the Q-pulse shaping signal generator 106, and the phase shifter 107. The fist oscillator 101 outputs the reference clock S101. The oscillator 102 generates the carrier signal S102. The spread data output section 103 directly spreads transmission data STXD using a specified spreading code SSS. The demultiplexer 104 distributes the spread data S103 generated by the direct spreading into the I data S104A and the Q data S104B. The I-pulse shaping signal generator 105 generates the I-pulse shaping signal S105. The Q-pulse shaping signal generator 106 generates the Q-pulse shaping signal S106. The phase shifter 107 shifts a phase of the carrier signal S102 and outputs the cosine carrier S107A and the sine carrier S107B. The configurations of these processing means are the same as those described in the first and second embodiments with reference to FIG. 3. Specific configuration examples of the I-pulse shaping signal generator 105 and the Q-pulse shaping signal generator 106 will be described later.

In this example, there are provided a seventh multiplier 131 and an eighth multiplier 132. The multiplier 131 multiplies the I data S104A output from the demultiplexer 140 and a cosine carrier output from the phase shifter 107 to output the BPSK modulated cosine carrier S131. The multiplier 132 multiplies the Q data S104B output from the demultiplexer 140 and a sine carrier output from the phase shifter 107 to output the BPSK modulated sine carrier S132.

Further, there are provided the third multiplier 110, the fourth multiplier 111, and the adder 112. The multiplier 110 multiplies the cosine carrier S131 BPSK-modulated by the multiplier 131 and the I-pulse shaping signal S105 output from the I-pulse shaping signal generator 105 together to output the BPSK modulated I pulse S110. The multiplier 111 multiplies the sine carrier S132 BPSK-modulated by the multiplier 132 and the Q-pulse shaping signal S106 output from the Q-pulse shaping signal generator 106 together to output the BPSK modulated Q pulse S111. The adder 112 synthesizes the I pulse S110 BPSK-modulated by the third multiplier 110 with the Q pulse S111 BPSK-modulated by the fourth multiplier 111 to generate the output signal S112. To synthesize the pulses and generate the output signal S112, the adder 112 uses polarities for subtracting the BPSK modulated Q pulse S111 from the BPSK modulated I pulse FIG. 7 exemplifies signal waveforms that are processed by the components of the configuration in FIG. 6. The following describes the waveforms in FIG. 7.

The reference clock S101 of FIG. 7(a) is a 4 [GHz] clock.

Data CLK of FIG. 7(b) is a 1 [GHz] clock signal. A configuration to supply the data clock is omitted from FIG. 6.

The spread data S103 of FIG. 7(c) is a 1 [Gbps] digital signal generated in the spread data output section 103 by directly spreading the transmission data STXD with the spreading code SSS.

The I data S104A of FIG. 7(d) is a 500 [Mbps] NRZ signal generated by distributing the spread data S103 in the demultiplexer 104 in the order indicated by broken lines.

The Q data S104B of FIG. 7(e) is a 500 [Mbps] NRZ signal generated by distributing the spread data S103 in the demultiplexer 104 in the order indicated by dot-dash lines.

The I-pulse shaping signal S105 of FIG. 7(f) is a stepped triangle-wave analog signal generated in the I-pulse shaping signal generator 105 and synchronizes with the I data S104A.

The Q-pulse shaping signal S106 of FIG. 7(g) is a stepped triangle-wave analog signal generated in the Q-pulse shaping signal generator 106 and synchronizes with the Q data S104B.

The cosine carrier S107A of FIG. 7(h) is a 4 [GHz] NRZ signal.

The sine carrier S107B of FIG. 7(i) is a 4 [GHz] NRZ signal and is phase-shifted from the cosine carrier S107A by 90 degrees.

The BPSK modulated cosine carrier S131 of FIG. 7(j) results from multiplying the cosine carrier S107A and the I data S104A together.

The BPSK modulated sine carrier S132 of FIG. 7(k) results from multiplying the cosine carrier S107B and the I data S104B together.

The BPSK modulated I pulse S110 of FIG. 7(l) results from multiplying the BPSK modulated cosine carrier S131 and the I-pulse shaping signal S105 together.

The BPSK modulated I pulse S111 of FIG. 7(m) results from multiplying the BPSK modulated sine carrier S132 and the Q-pulse shaping signal S106 together.

The output signal S112 of FIG. 7(n) is generated by subtracting the BPSK modulated Q pulse S111 from the BPSK modulated I pulse S110 and becomes the same as that in the first and second embodiments.

The spread data output section 103 sequentially outputs the spread data S103 in the transmitter 120 according to the third embodiment. The spread data S103 synchronizes with the reference clock signal S101 and is generated by directly spreading the transmission data STXD with the spreading code sequence SSS. The demultiplexer 104 divides the spread data S103 into the I data S104A and the Q data S104B. Here, the I data S104A and the Q data S104B maintain the time relationship so that their transition timings shift by a half cycle. Both data are NRZ signals having a signal rate that is half the spread data S103. The I-pulse shaping signal generator 105 and the Q-pulse shaping signal generator 106 generate the I-pulse shaping signal S105 and the Q-pulse shaping signal S106 as stepped triangle waves. The I-pulse shaping signal S105 and the Q-pulse shaping signal S106 are generated at the timings so that each peak value of the waveforms corresponds to the center of the I data S104A and the Q data S104B, respectively.

The seventh multiplier 131 multiplies the I data S104A and the cosine carrier S107A together to generate the BPSK modulated cosine carrier S131. The eighth multiplier 132 multiplies the Q data S104B and the sine carrier S107B together to generate the BPSK modulated sine carrier S132. The third multiplier 110 multiplies the BPSK modulated the cosine carrier S131 and the I-pulse shaping signal S105 together to output the BPSK modulated I pulse S110. The fourth multiplier 111 multiplies the BPSK modulated the sine carrier S132 and the Q-pulse shaping signal S106 together to output the BPSK demodulated Q pulse S111. The adder 112 uses polarities for subtracting the BPSK modulated Q pulse S111 from the BPSK modulated I pulse S110 to synthesize both pulses and generates the output signal S112.

The output signal S112 generated from the transmitter 130 according to the third embodiment is essentially the same as that described in the first and second embodiments. That is to say, the output signal shows a constant envelope and can realize a transmitter with high power efficiency. No band-pass filters are needed for transmission. The transmission side is free from an inter-symbol interference. The signal rate of the I and Q pulses each is half the spread data. This doubles an interval of the I and Q pulses in themselves. The pulses are subject to little inter-symbol interference occurring in the band-pass filter at the reception side.

Figure 8:
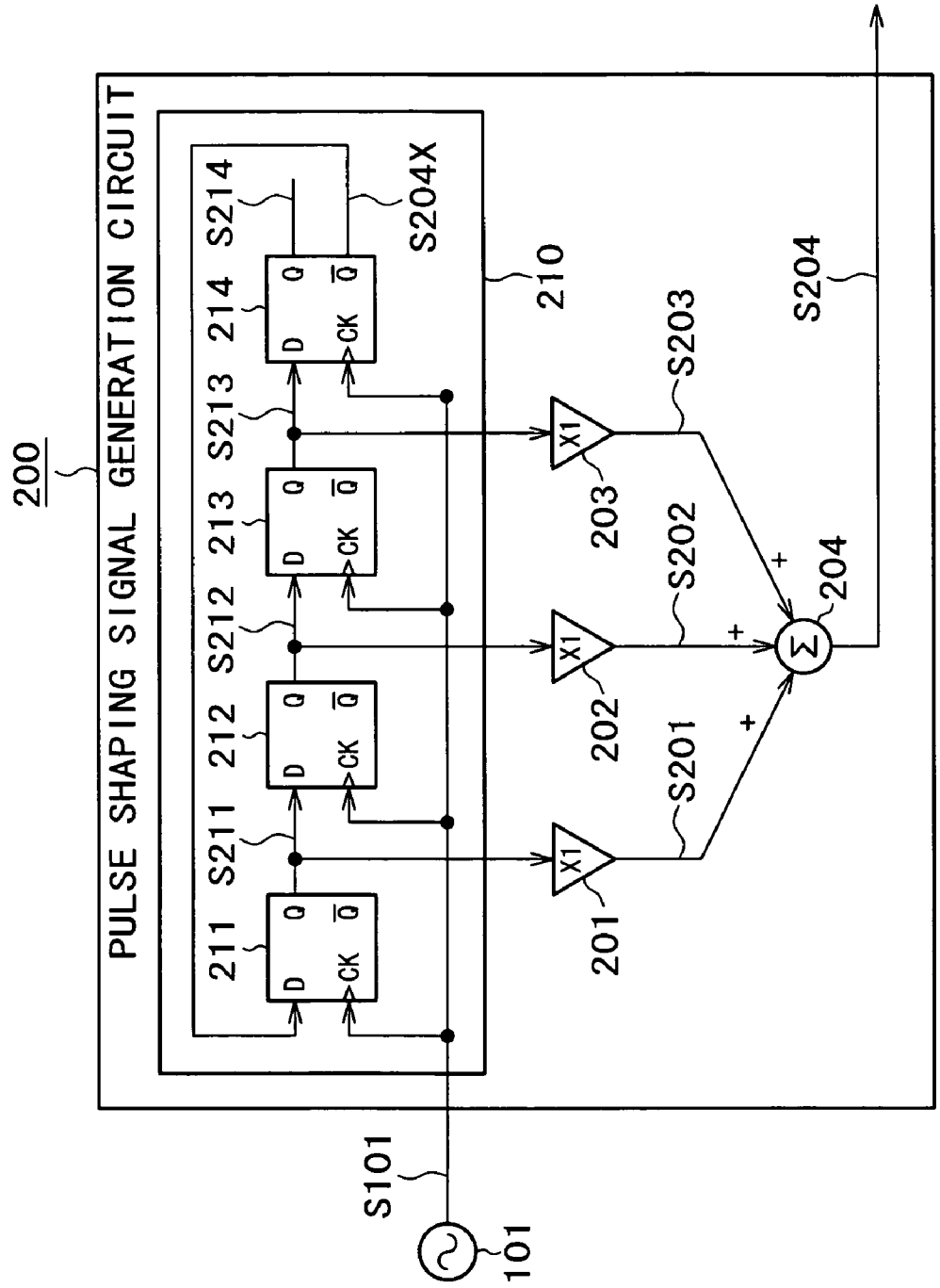
FIG. 8 is a block diagram exemplifying the configuration of a pulse shaping signal generation circuit.
Figure 9:
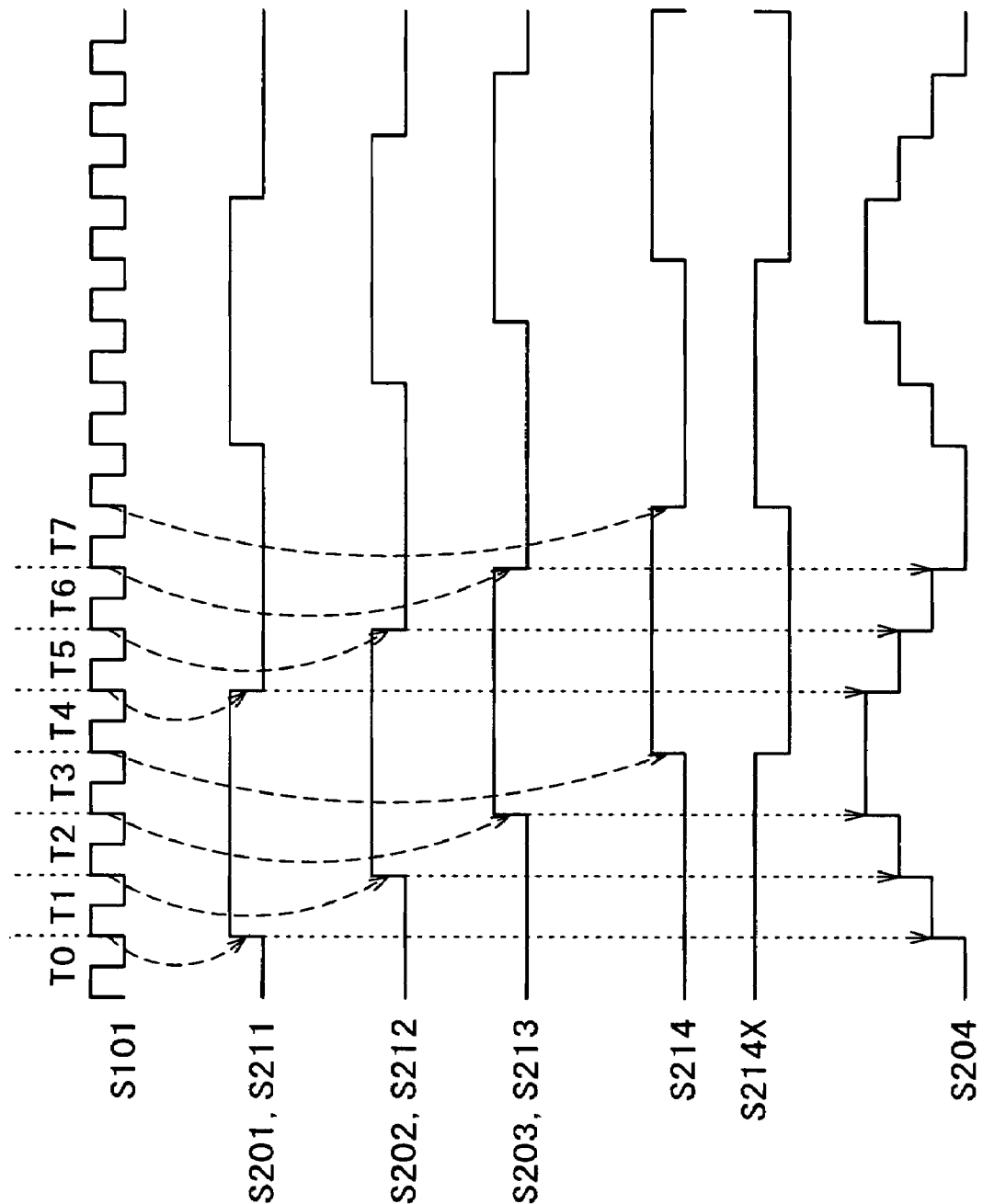
FIG. 9 is a waveform chart exemplifying signal waveforms of the circuit in FIG. 8.
Figure 10:
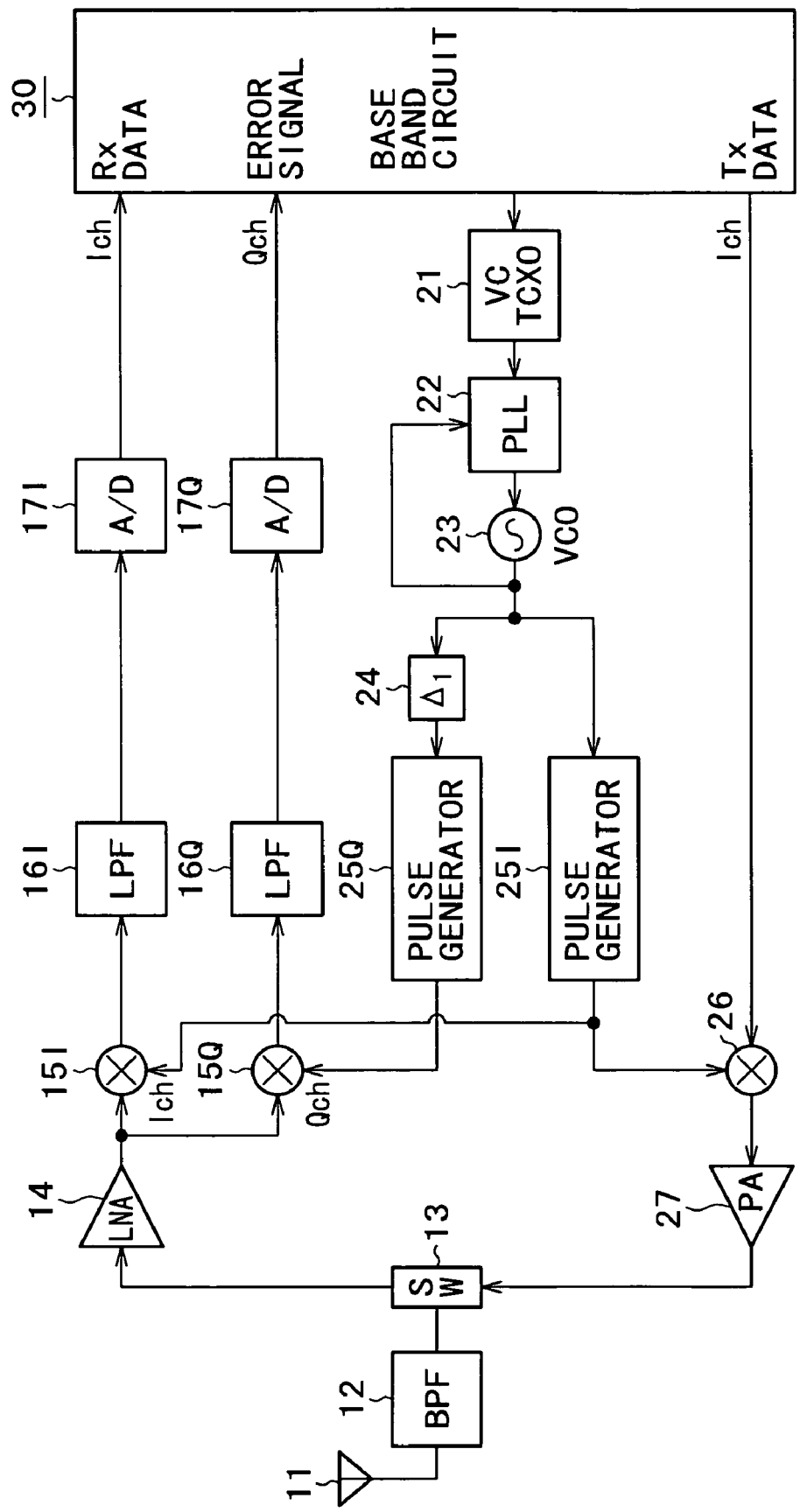
FIG. 10 is a block diagram exemplifying the configuration of a communication apparatus according to the conventional UWB system.
Figure 11:
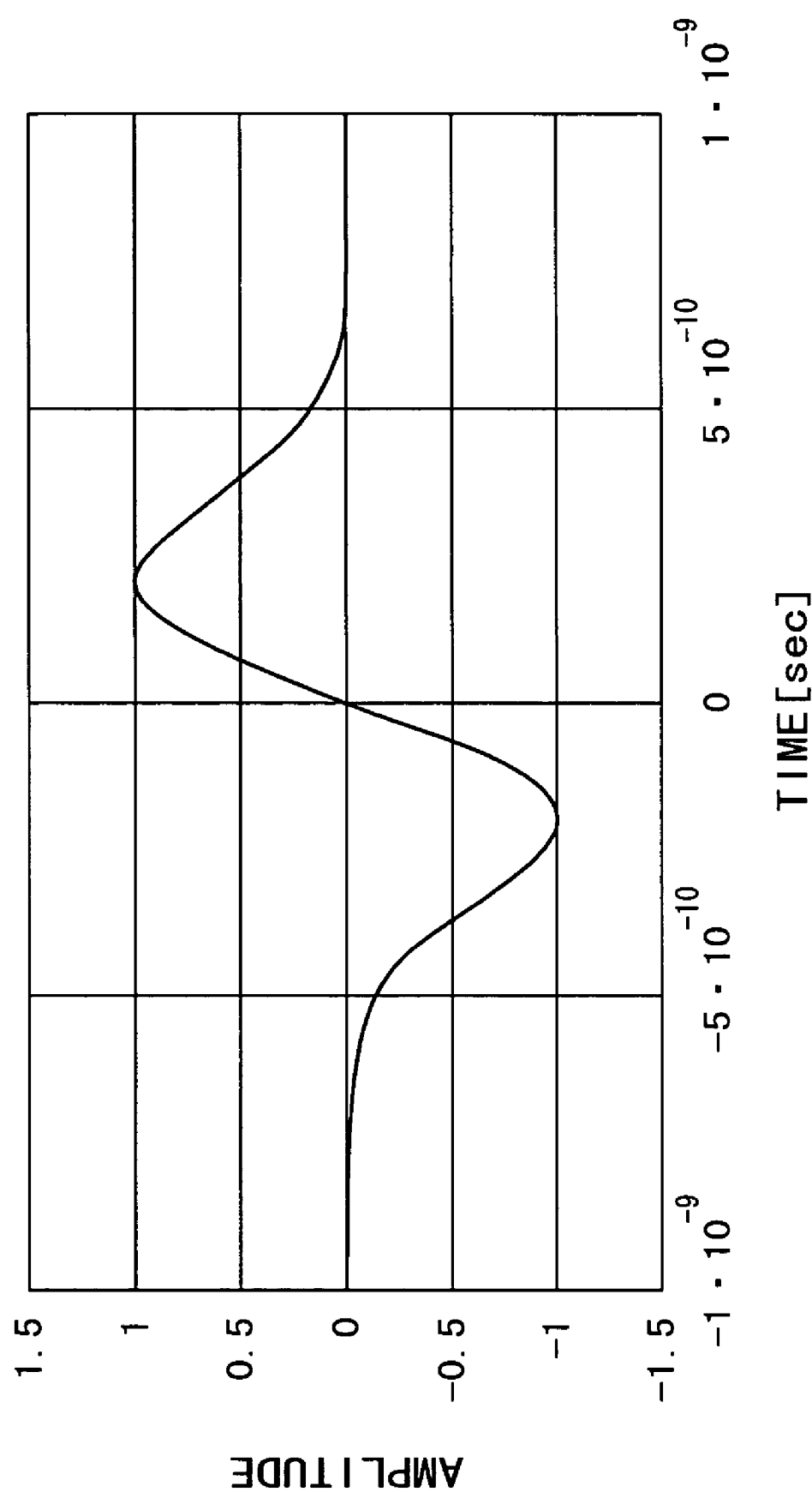
FIG. 11 is a waveform chart showing a mono-cycle pulse.
Figure 12:
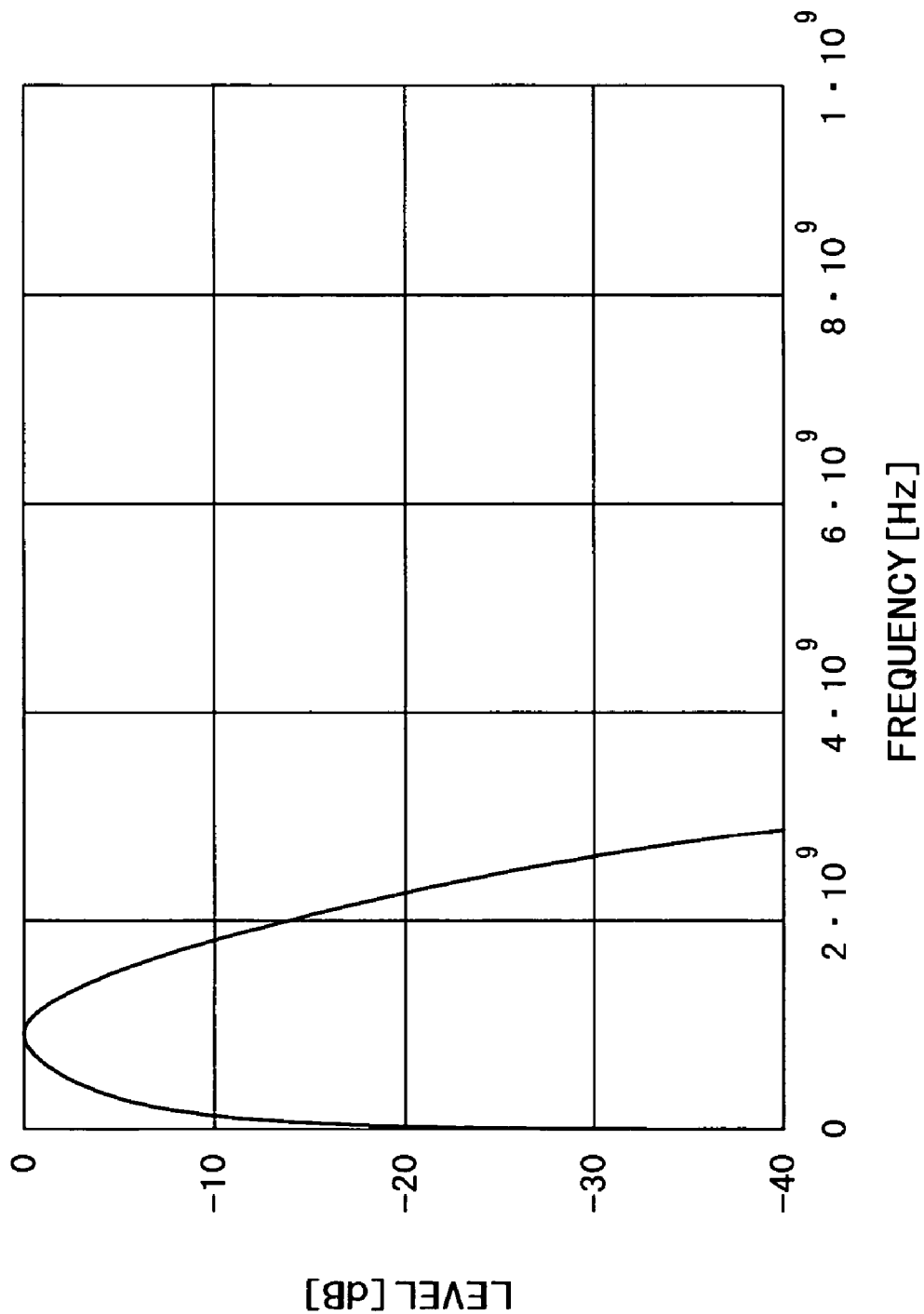
FIG. 12 is a frequency characteristics diagram showing a frequency spectrum of the mono-cycle pulse in FIG. 11.
Figure 13:
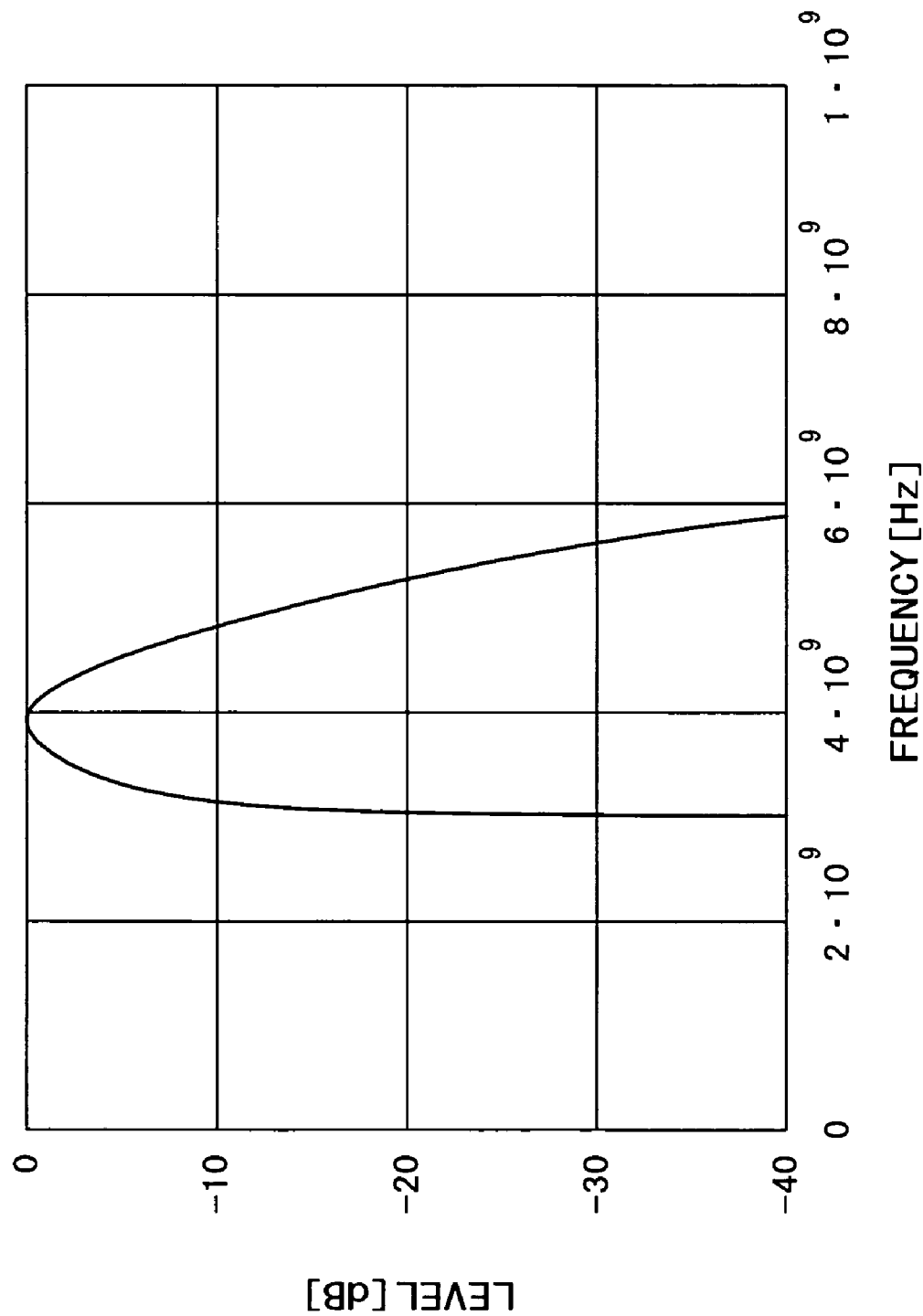
FIG. 13 is a frequency characteristics diagram showing a frequency spectrum of the upper wave generated in the mono-cycle pulse in FIG. 11.
Figure 14:
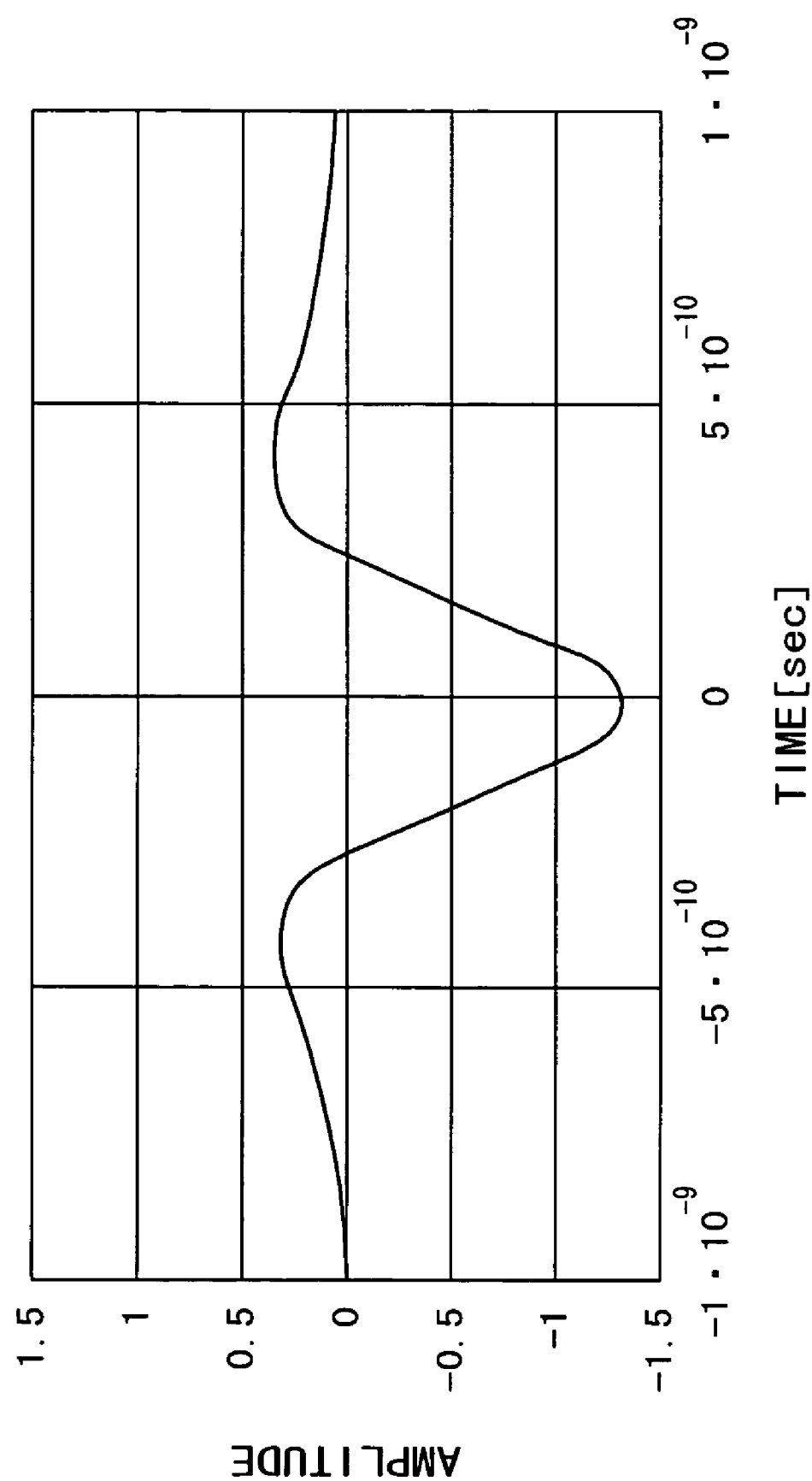
FIG. 14 is a waveform chart showing a waveform generated by Hilbert transforming the mono-cycle pulse in FIG. 11.

The following describes specific configuration examples of the I-pulse shaping signal generator 105 and the Q-pulse shaping signal generator 106 described in the first through third embodiments. FIG. 8 shows the configuration of the pulse shaping signal generation circuit 200. FIG. 9 diagrams waveforms operating in the circuit 200.

A pulse shaping signal generation circuit 200 in FIG. 8 is used as the I-pulse shaping signal generator 105 and the Q-pulse shaping signal generator 106. The pulse shaping signal generation circuit 200 has a first DFF (D flip-flop) 211, a second DFF 212, a third DFF 213, a fourth DFF 214, a first current source 201, a second current source 202, a third current source 203, and a current-voltage conversion circuit 204.

The first through fourth DFFs 211, 212, 213, 214 constitute a 4-stage Johnson counter 210 that operates synchronously with a reference clock S101 (FIG. 9(a)) output from an oscillator 101. As seen from waveforms of (b), (c), (d), and (e) in FIG. 9, Q outputs S211, S212, S213, and S214 from the first through fourth DFFs of the Johnson counter 210 rise from low to high levels and fall from high to low levels in order in synchronization with the rise of the reference clock S101.

The Q outputs S211, S212, and S213 from the first through third DFFs turn on or off output currents from the first through third current sources 201, 202, and 203. The current-voltage conversion circuit 204 adds output currents S201, S202, and S203 to each for current-voltage conversion. This can generate a pulse shaping signal S204 having a stepped triangle waveform as seen from FIG. 9(g). Further, it is possible to change the waveform of the generated pulse shaping signal S204 by weighting output currents from the first through third current sources 201, 202, and 203.

The pulse shaping signal generation circuit 200 shown in FIGS. 8 and 9 exemplifies a specific configuration of the I-pulse shaping signal generator 105 and the Q-pulse shaping signal generator 106. It is to be distinctly understood that the other configurations may be used to generate a similar waveform.

Further, the above-mentioned first through third embodiments have described the frequencies and cycles simply as examples. It should also be understood that the other values may be specified without departing from the spirit and scope of the invention.

The above-mentioned embodiments have described the configuration examples assuming the special communication apparatus for transmission or transmission and reception. Further, for example, a personal computer for various data processing may be mounted with a board or a card designed for the communication processing equivalent to the transmitter according to the embodiment. The computer may be provided with the software to perform the processing in the baseband section.

Since the present invention provides the constant envelope in an output signal, it becomes possible to use nonlinear amplifiers such as C-class amplifiers for transmission, realizing a transmitter with high power efficiency.

Since the narrow-band frequency spectrum is used, no band-pass filters are needed for transmission. Since waveforms are free from deterioration due to band-pass filters for transmission, it is possible to realize a UWB communication apparatus characterized by a high transmission rate. Since no band-pass filters are used, no transmission power loss occurs, making it possible to realize a transmitter with high power efficiency and low power consumption.

Further, it is possible to decrease effects of inter-symbol interference due to the use of non-Nyquist filters The UWB communication speed can be increased.

What is claimed is:

1. A transmission method comprising the steps of:
   generating a reference clock signal;
   sequentially outputting spread data at a specified timing synchronized with the reference clock, wherein the spread data results from directly spreading transmission data with a spreading code;
   distributing the spread data into two sequences of data at a specified timing synchronized with the reference clock;
   generating a first pulse shaping signal at a specified timing synchronized with the reference clock;
   generating a second pulse shaping signal at a specified timing synchronized with the reference clock;
   generating a cosine carrier and a sine carrier;
   multiplying one of the two sequences of data, the first pulse shaping signal, and the cosine carrier together;
   multiplying the other of the two sequences of data, the second pulse shaping signal, and the sine carrier together; and
   synthesizing outputs from the multiplications to acquire an output signal for transmission.

2. The transmission method according to claim 1, further comprising the steps of:
   as multiplication among one of the two sequences of data, the first pulse shaping signal, and the cosine carrier together,
   multiplying the first pulse shaping signal and the cosine carrier together and multiplying a resulting multiplied signal and one of the two sequences of data together; and
   as multiplication among the other of the two sequences of data, the second pulse shaping signal, and the sine carrier together,
   multiplying the second pulse shaping signal and the sine carrier together and multiplying a resulting multiplied signal and the other of the two sequences of data together.

3. The transmission method according to claim 1, further comprising the steps of:
   as multiplication among one of the two sequences of data, the first pulse shaping signal, and the cosine carrier together,
   multiplying one of the two sequences of data and the first pulse shaping signal together and multiplying a multiplication output and the cosine carrier together; and
   as multiplication among the other of the two sequences of data, the second pulse shaping signal, and the sine carrier together,
   multiplying the other of the two sequences of data and the second pulse shaping signal together and multiplying a multiplication output and the sine carrier together.

4. The transmission method according to claim 1, further comprising the steps of:
   as multiplication among one of the two sequences of data, the first pulse shaping signal, and the cosine carrier together,
   multiplying one of the two sequences of data and the cosine carrier together and multiplying a multiplication output and the first pulse shaping signal; and
   multiplying the other of the two sequences of data and the second pulse shaping signal together and multiplying a multiplication output and the sine carrier together.

5. The transmission method according to claim 1, further comprising the step of:
   acquiring the first and second pulse shaping signals by shifting a pulse, having a cycle equivalent to a specified multiple of the reference clock signal, to a plurality of phases and by adding the multi-phase pulses.

6. A transmitter comprising:
   a clock generation means for generating a reference clock signal;
   a spread data output means for sequentially outputting spread data at a specified timing synchronized with the reference clock, wherein the spread data results from directly spreading transmission data with a spreading code;
   a distribution means for distributing the spread data into two sequences of data at a specified timing synchronized with the reference clock;
   a first pulse shaping signal generation means for generating a first pulse shaping signal at a specified timing synchronized with the reference clock;
   a second pulse shaping signal generation means for generating a second pulse shaping signal at a specified timing synchronized with the reference clock;
   a carrier generation means for generating a cosine carrier and a sine carrier;
   a first multiplication means for multiplying one of the two sequences of data, the first pulse shaping signal, and the cosine carrier together;
   a second multiplication means for multiplying the other of the two sequences of data, the second pulse shaping signal, and the sine carrier together; and a synthesis means for synthesizing multiplication outputs from the first and second multiplication means.

7. The transmitter according to claim 6,
wherein the first multiplication means comprises a multiplication means for multiplying the first pulse shaping signal by the cosine carrier and another multiplication means for multiplying multiplication output from the multiplication means by one of the two sequences of data; and
wherein the second multiplication means comprises a multiplication means for multiplying the second pulse shaping signal by the sine carrier and another multiplication means for multiplying multiplication output from the multiplication means by the other of the two sequences of data.

8. The transmitter according to claim 6,
wherein the first multiplication means comprises a multiplication means for multiplying one of the two sequences of data by the first pulse shaping signal and another multiplication means for multiplying multiplication output from the multiplication means by the cosine carrier; and
wherein the second multiplication means comprises a multiplication means for multiplying the other of the two sequences of data by the second pulse shaping signal and another multiplication means for multiplying multiplication output from the multiplication means by the sine carrier.

9. The transmitter according to claim 6,
wherein the first multiplication means comprises a multiplication means for multiplying one of the two sequences of data by the cosine carrier and another multiplication means for multiplying multiplication output from the multiplication means by the first pulse shaping signal; and
wherein the second multiplication means comprises a multiplication means for multiplying the other of the two sequences of data by the sine carrier and another multiplication means for multiplying multiplication output from the multiplication means by the second pulse shaping signal.

10. The transmitter according to claim 6,
wherein the first and second pulse shaping signal generation means comprise:
a clock count means for shifting a pulse, having a cycle equivalent to a specified multiple of the reference clock signal, to a plurality of phases; and
an addition means for adding multi-phase pulses output from the clock count means.

* * * * *